United States Patent
Matsuda

(10) Patent No.: US 9,913,148 B2
(45) Date of Patent: Mar. 6, 2018

(54) DATA PROCESSING APPARATUS THAT DISCRIMINATES A NETWORK FORMED BY A NORMAL ACCESS POINT FROM A NETWORK FORMED BY A SIMPLE ACCESS POINT FUNCTION

(71) Applicant: CANON KABUSHIKI KAISHA, Tokyo (JP)

(72) Inventor: Jun Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 13/940,112

(22) Filed: Jul. 11, 2013

(65) Prior Publication Data
US 2014/0022980 A1 Jan. 23, 2014

(30) Foreign Application Priority Data
Jul. 18, 2012 (JP) .................................. 2012-159520

(51) Int. Cl.
  *H04W 48/20* (2009.01)
  *H04W 16/26* (2009.01)
  *H04W 48/18* (2009.01)
  *H04W 84/22* (2009.01)
  *H04N 1/00* (2006.01)

(52) U.S. Cl.
  CPC ........ *H04W 16/26* (2013.01); *H04N 1/00307* (2013.01); *H04W 48/18* (2013.01); *H04W 84/22* (2013.01)

(58) Field of Classification Search
  CPC ........ H04W 16/26; H04W 8/24; H04W 76/02
  See application file for complete search history.

(56) References Cited

U.S. PATENT DOCUMENTS

| 2010/0120439 A1* | 5/2010 | Hashimoto | H04W 36/32 455/445 |
| 2010/0172291 A1* | 7/2010 | Kim | H04W 48/20 370/328 |
| 2012/0099476 A1* | 4/2012 | Mahaffy | H04L 67/16 370/254 |

FOREIGN PATENT DOCUMENTS

| CN | 102342173 A | 2/2012 | |
| EP | 2018002 A1 * | 1/2009 | ......... H04L 12/5691 |
| JP | 2005124121 A | 5/2005 | |
| JP | 2007-166577 A | 6/2007 | |
| JP | 2010062904 A | 3/2010 | |
| JP | 2010068295 A | 3/2010 | |
| KR | 10-2012-0052092 A | 5/2012 | |
| WO | 01/35585 A | 5/2001 | |
| WO | 2010/078598 A | 7/2010 | |
| WO | 2012/054210 A | 4/2012 | |
| WO | 2012/067382 A | 5/2012 | |

* cited by examiner

*Primary Examiner* — Lakeram Jangbahadur
(74) *Attorney, Agent, or Firm* — Canon U.S.A., Inc. IP Division

(57) ABSTRACT

A communication apparatus capable of participating in a network formed by a relay apparatus establishes communication with a data processing apparatus via a first network, receives a notification indicating whether the data processing apparatus forms the first network as the relay apparatus from the data processing apparatus, and controls whether to transmit or receive data via the Internet according to contents of the notification received from the data processing apparatus via the relay apparatus forming the first network in which the communication apparatus participates at present.

17 Claims, 14 Drawing Sheets

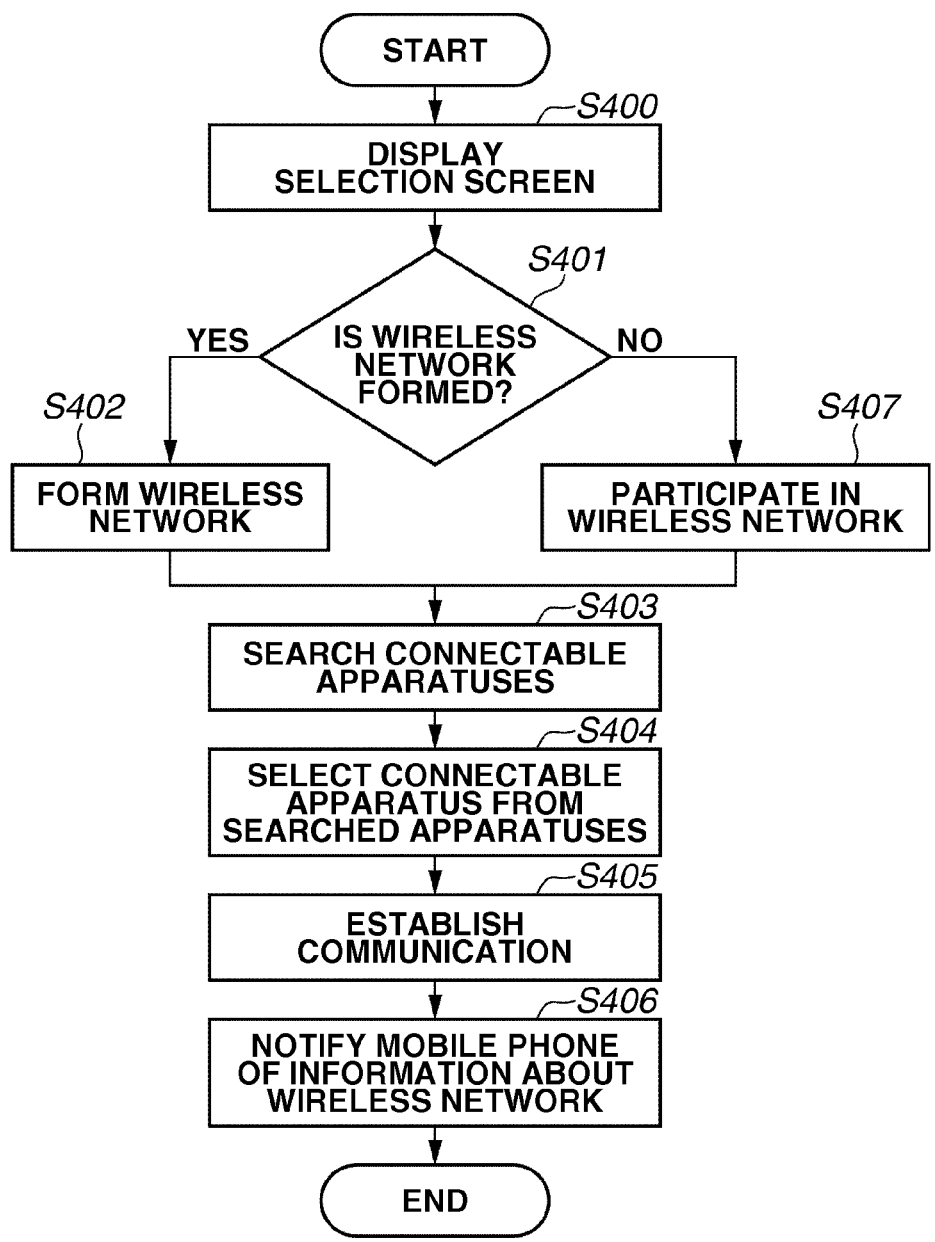

FIG.5A-A
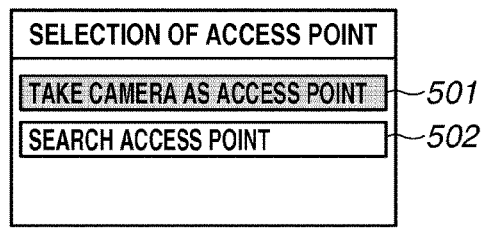
FIG.5A-B
FIG.5A-C
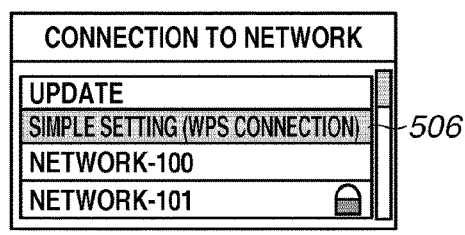
FIG.5A-D
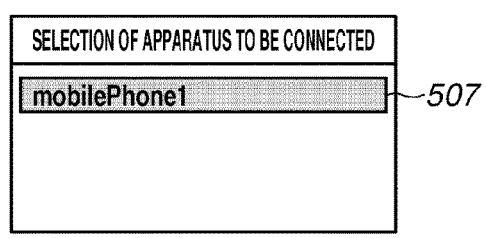
FIG.5A-E
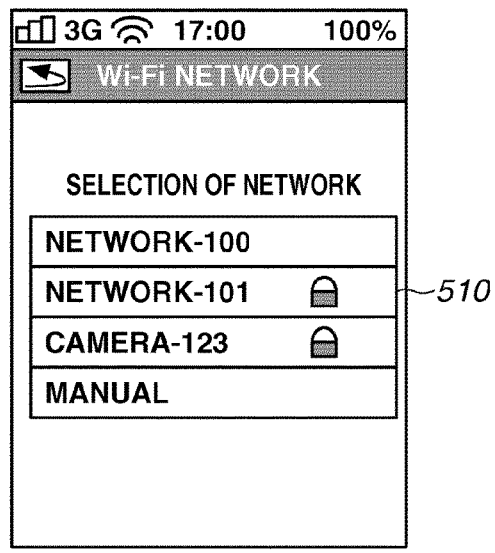
FIG.5A-F
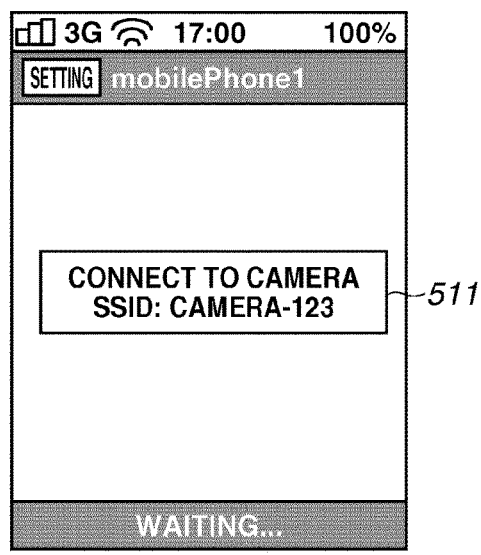

FIG.5B-A
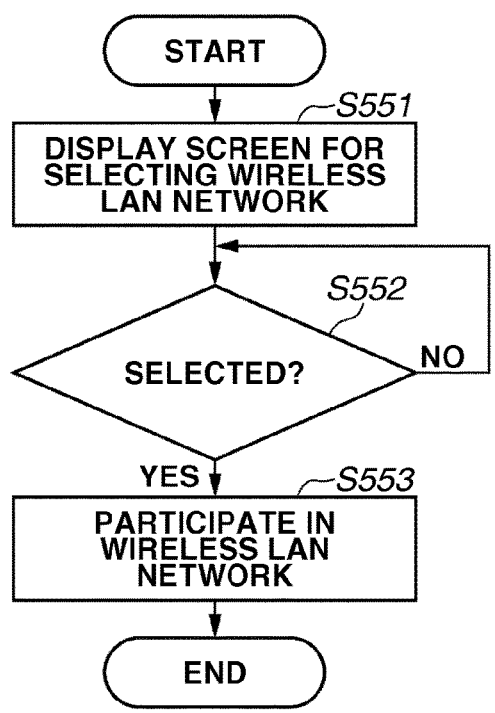
FIG.5B-B
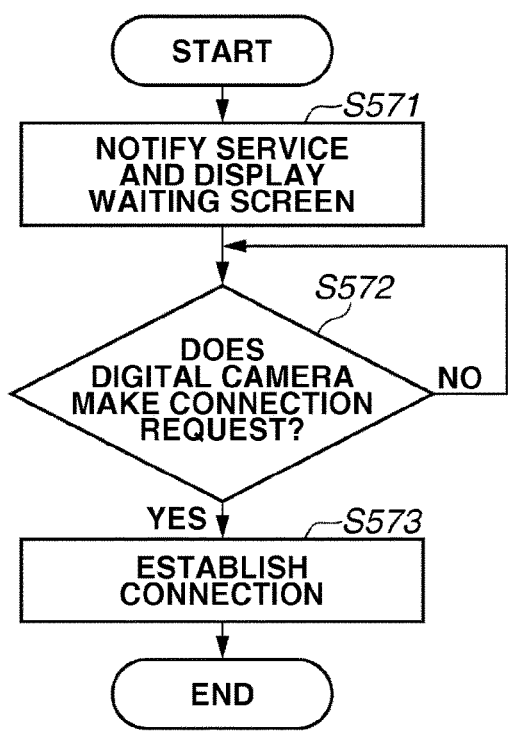

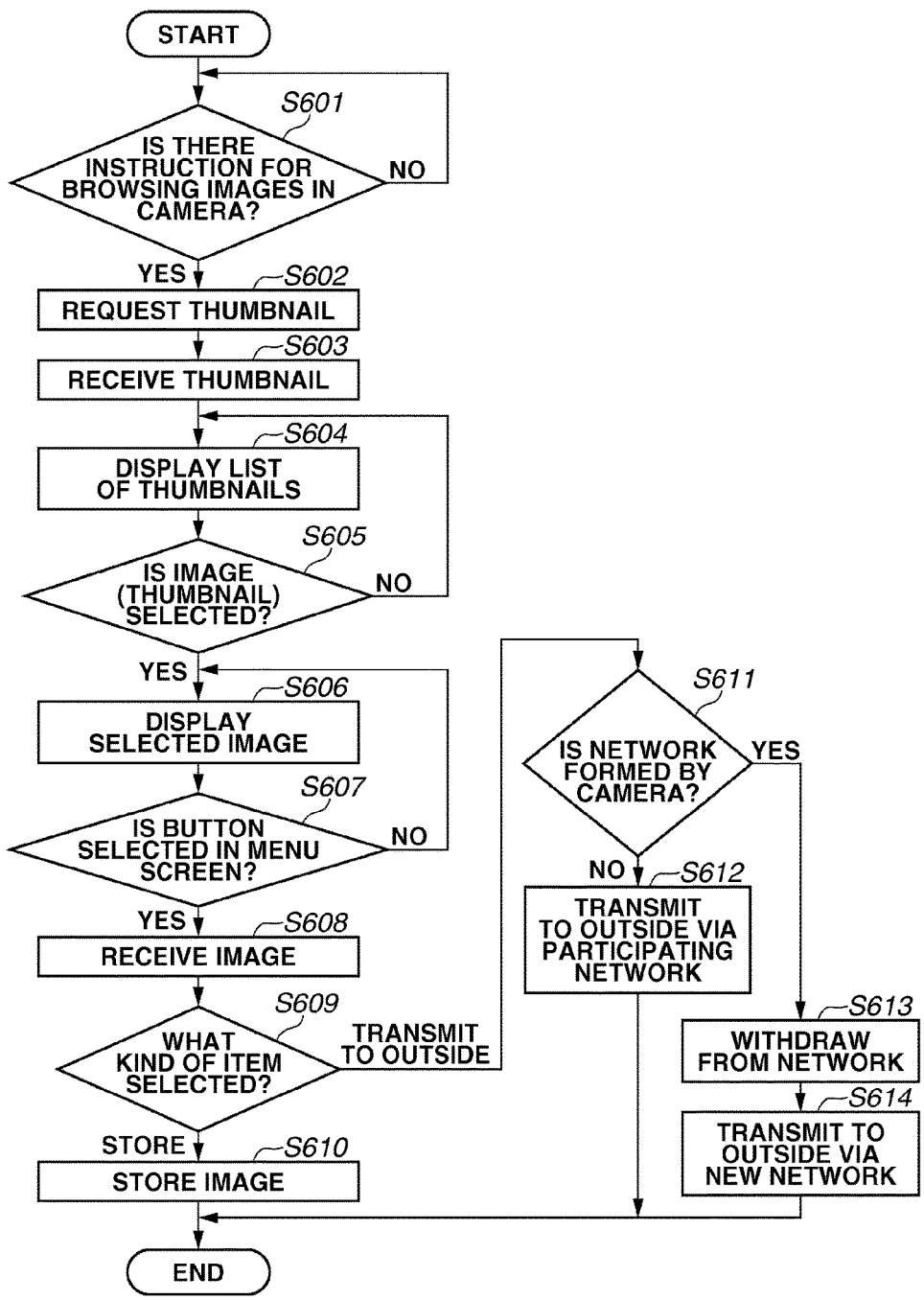

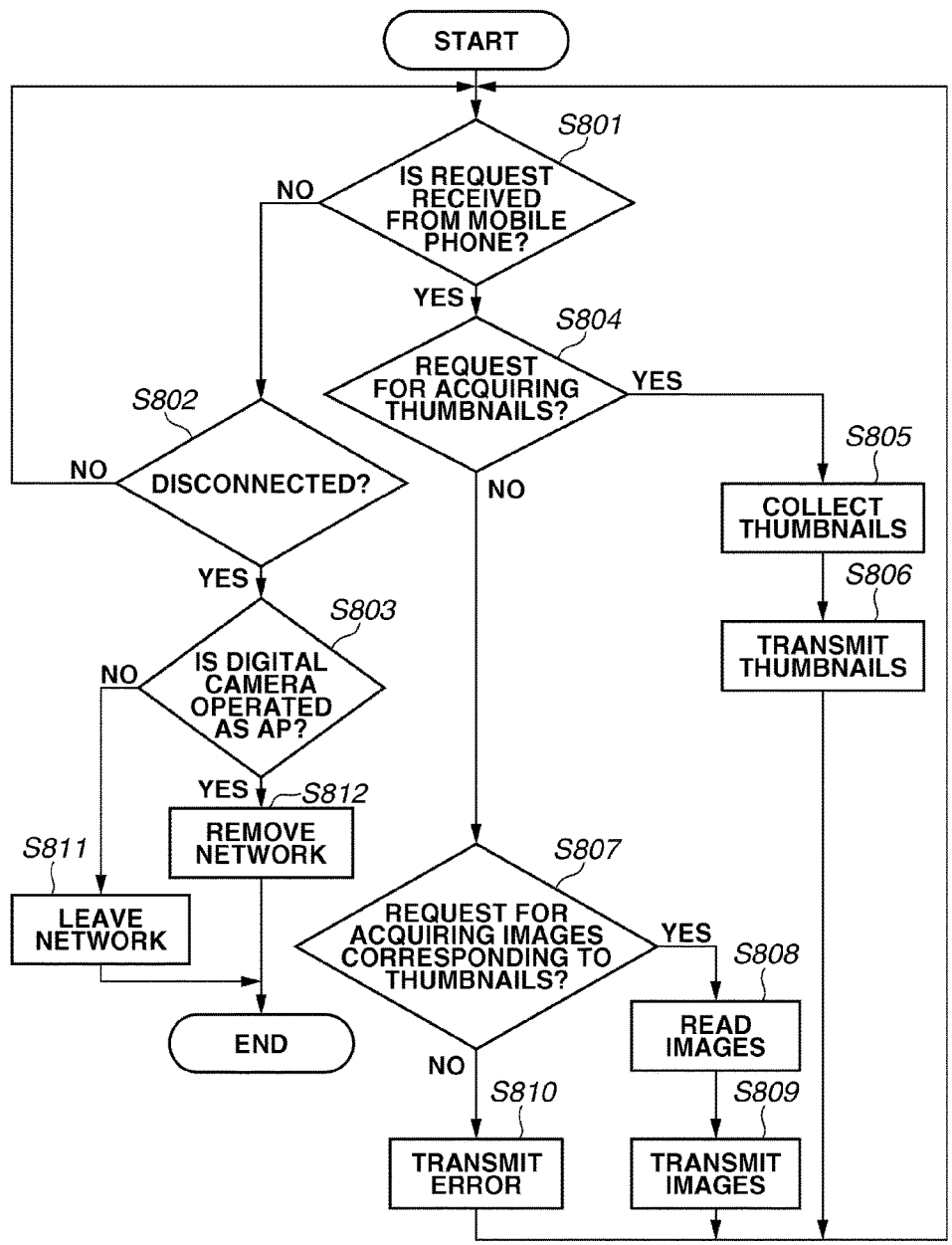

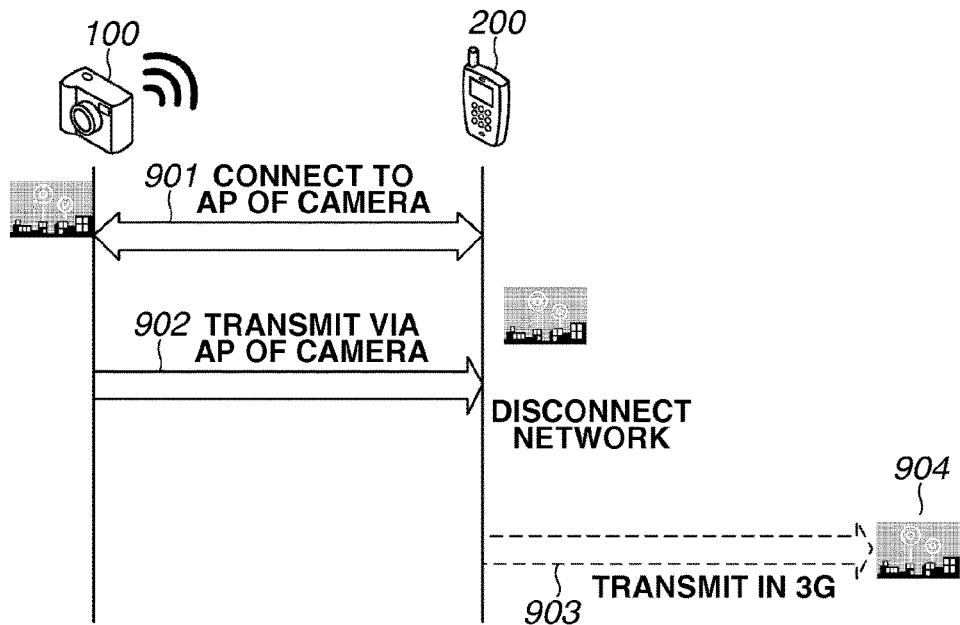
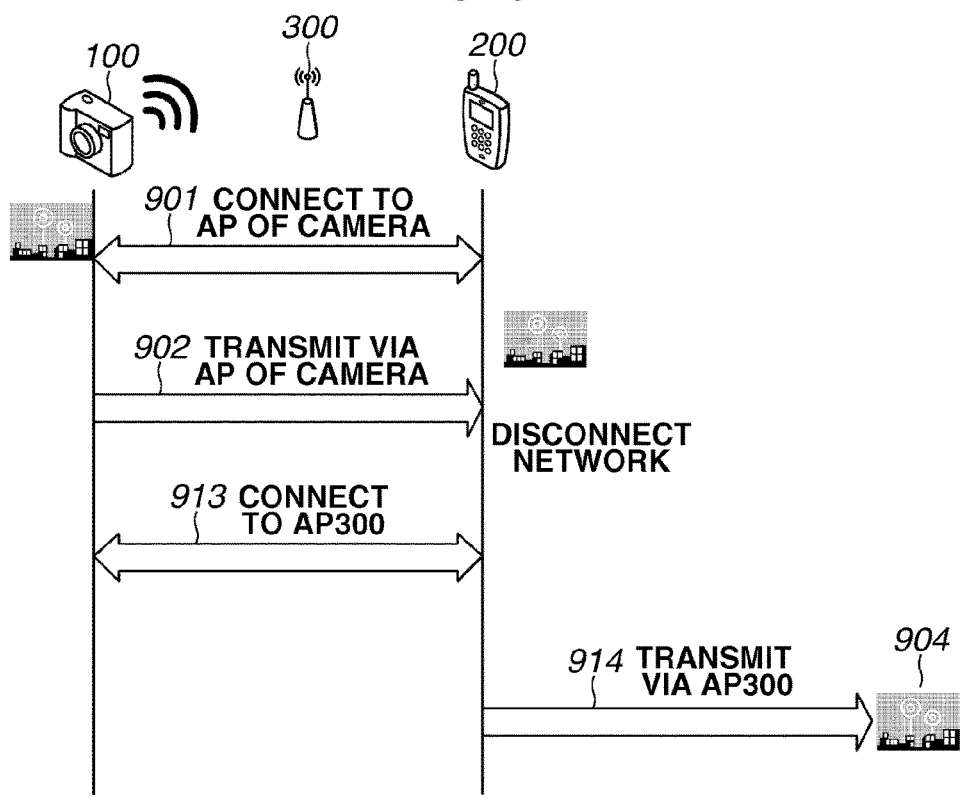

DATA PROCESSING APPARATUS THAT DISCRIMINATES A NETWORK FORMED BY A NORMAL ACCESS POINT FROM A NETWORK FORMED BY A SIMPLE ACCESS POINT FUNCTION

BACKGROUND OF THE INVENTION

Field of the Invention

The present invention relates to a technique for communicating with other apparatuses via a network.

Description of the Related Art

As discussed in Japanese Patent Application Laid-Open No. 2007-166577, there has been known a technique in which a wireless communication function is mounted on a data processing apparatus such as a digital camera and image data stored in the data processing apparatus is transmitted to an external apparatus. The use of the function allows the image data to be easily transmitted to the external apparatus.

In recent years, there has been known a digital camera on which a simple access point (for example a micro access point) function is mounted. When the digital camera starts the simple access point function, other apparatuses detect the digital camera as an access point and participate in a network formed by the digital camera. Thus, the digital camera can be easily communicated with other apparatuses.

A relay apparatus such as an access point generally used has a line connected to a public network and is capable of performing communication via the Internet. On the other hand, an apparatus such as a digital camera generally does not have a line connected to the public network. Therefore, if the apparatus participates in the network formed by the simple access point function, the apparatus may not be able to communicate with the external network such as the Internet.

As described above, the network formed by the simple access point function is different in characteristic from a network formed by a normal access point. However, in viewing from an apparatus participating in the network, it is difficult to discriminate the network formed by the normal access point from the network formed by the simple access point function.

SUMMARY OF THE INVENTION

The present invention is directed to a communication apparatus.

According to a first aspect of the present invention, there is provided capable of participating in a network formed by a relay apparatus, the communication apparatus comprising a data communication unit configured to establish communication with a data processing apparatus via a first network to perform data communication with the data processing apparatus, a reception unit configured to receive a notification indicating whether the data processing apparatus forms the first network as the relay apparatus from the data processing apparatus, and a control unit configured to control transmission or reception of data via the Internet, wherein the control unit controls whether to transmit or receive data via the Internet according to contents of the notification received by the reception unit via the relay apparatus forming the first network in which the communication apparatus participates at present.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating an operation of the digital camera according to the first exemplary embodiment.

FIGS. 5A-A, 5A-B, 5A-C, 5A-D, 5A-E, and 5A-F illustrate examples of display screens according to the first exemplary embodiment.

FIGS. 5B-A and 5B-B are flowcharts respectively illustrating an operation of the mobile phone according to the first exemplary embodiment.

FIG. 6 is a flowchart illustrating an operation of the mobile phone according to the first exemplary embodiment.

FIG. 8 is a flowchart illustrating an operation of the mobile phone according to the first exemplary embodiment.

FIGS. 9A and 9B respectively illustrate an outline of an operation according to the first exemplary embodiment.

DESCRIPTION OF THE EMBODIMENTS

Various exemplary embodiments, features, and aspects of the invention will be described in detail below with reference to the drawings.

[Configuration of Digital Camera]

Figure 1:
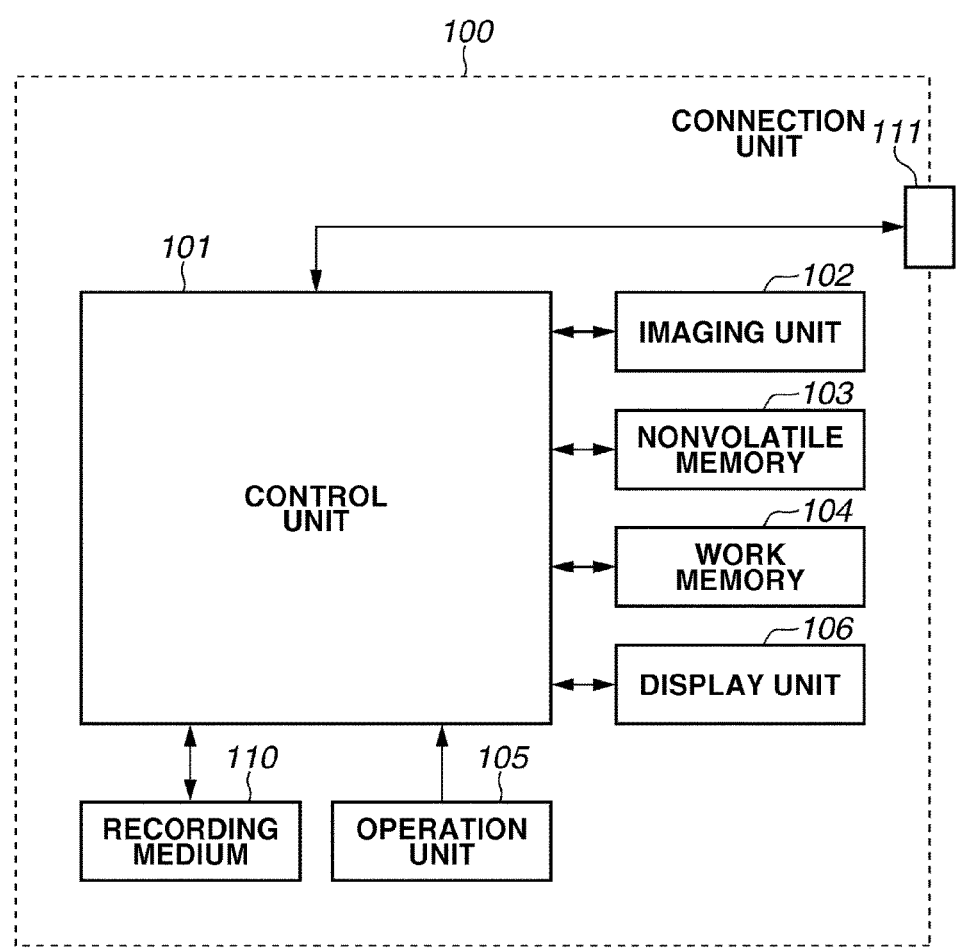
FIG. 1 is a block diagram illustrating a configuration of a digital camera according to a first exemplary embodiment.

FIG. 1 is a block diagram illustrating an example of a configuration of a digital camera 100 which is an example of a data processing apparatus according to the present exemplary embodiment. Herein, a digital camera is described as an example of the data processing apparatus, however, the data processing apparatus is not limited to the digital camera. The data processing apparatus may be a portable media player or an information processing apparatus such as a tablet device and a personal computer, for example.

A control unit 101 controls each unit of the digital camera 100 according to an input signal and a program described below. A plurality of hardware units may share processing to control the entire apparatus instead of the control unit 101 controlling the entire apparatus.

An imaging unit 102 converts an object light imaged by a lens included in the imaging unit 102 into an electric signal, subjects the electric signal to noise reduction processing, and outputs digital data as image data. The captured image data is stored in a buffer memory, and then the control unit 101 performs a predetermined calculation thereof to store the image data in a recording medium 110.

A nonvolatile memory 103 is an electrically erasable and recordable nonvolatile memory, and stores programs described below executed by the control unit 101.

A work memory 104 is used as a buffer memory which temporarily stores the image data captured by the imaging unit 102, an image display memory for the display unit 106, and a work area for the control unit 101.

An operation unit 105 is used to receive user's instructions provided for the digital camera 100 from the user. The operation unit 105 includes operation members such as a power source button for the user issuing instructions for turning on/off the power source of the digital camera 100, a release switch for the user issuing instructions for imaging, and a reproduction button for the user issuing instructions for reproducing image data, for example. The operation unit 105 further includes a touch panel formed on a display unit 106 described below.

The release switch has switches SW1 and SW2. The release switch is half-pressed to turn on the SW1, which means to receive instructions for imaging preparation for autofocus (AF) processing, automatic exposure (AE) processing, automatic white balance (AWB) processing, and electronic flash preliminary emission (EF) processing. The release switch is fully pressed to turn on the SW2, which means to receive instructions for imaging.

A display unit 106 displays a view finder image in imaging, captured image data, and characters for an interactive operation. The digital camera 100 does not necessarily need to incorporate the display unit 106 therein. The digital camera 100 is connectable to the inner or the external display unit 106 and has only to include at least a display control function for controlling the display of the display unit 106.

The recording medium 110 can record image data output from the imaging unit 102. The recording medium 110 may be detachable to or incorporated in the digital camera 100. In other words, the digital camera 100 has only to have a unit for accessing at least the recording medium 110.

A connection unit 111 is an interface for connecting to an external apparatus. The digital camera 100 according to the present exemplary embodiment can transfer data to and from the external apparatus via the connection unit 111. In the present exemplary embodiment, the connection unit 111 includes an interface for communicating with the external apparatus via a wireless local area network (LAN). The control unit 101 controls the connection unit 111 to realize wireless communication with the external apparatus. A communication system is not limited to the wireless LAN.

The digital camera 100 according to the present exemplary embodiment can operate as a slave device in an infrastructure mode. In a case where the digital camera 100 operates as the slave device, the digital camera 100 is connected to a nearby access point (hereinafter referred to as AP) to allow participating in a network formed by the AP.

The digital camera 100 according to the present exemplary embodiment is a kind of the AP, however, it can also operate as a simple AP (hereinafter referred to as simple AP) whose function is limited (for example a micro access point). The AP according to the present exemplary embodiment is an example of a relay apparatus. The digital camera 100 operates as the simple AP to form a network by itself. The peripherals of the digital camera 100 recognize the digital camera 100 as the AP to allow participating in the network formed by the digital camera 100. It is assumed that the programs for thus operating the digital camera 100 are stored in the nonvolatile memory 103.

The digital camera 100 according to the present exemplary embodiment is a kind of the AP, however, the digital camera 100 is the simple AP which does not have a gateway function for transferring data received from the slave device to an Internet provider. For this reason, even if the digital camera 100 receives data from other apparatuses participating in the network formed by the digital camera 100, the digital camera 100 cannot transfer the data to a network such as the Internet.

The digital camera 100 is described above. A mobile phone 200 which is an example of the external apparatus will be described below.

[Configuration of Mobile Phone]

Figure 2:
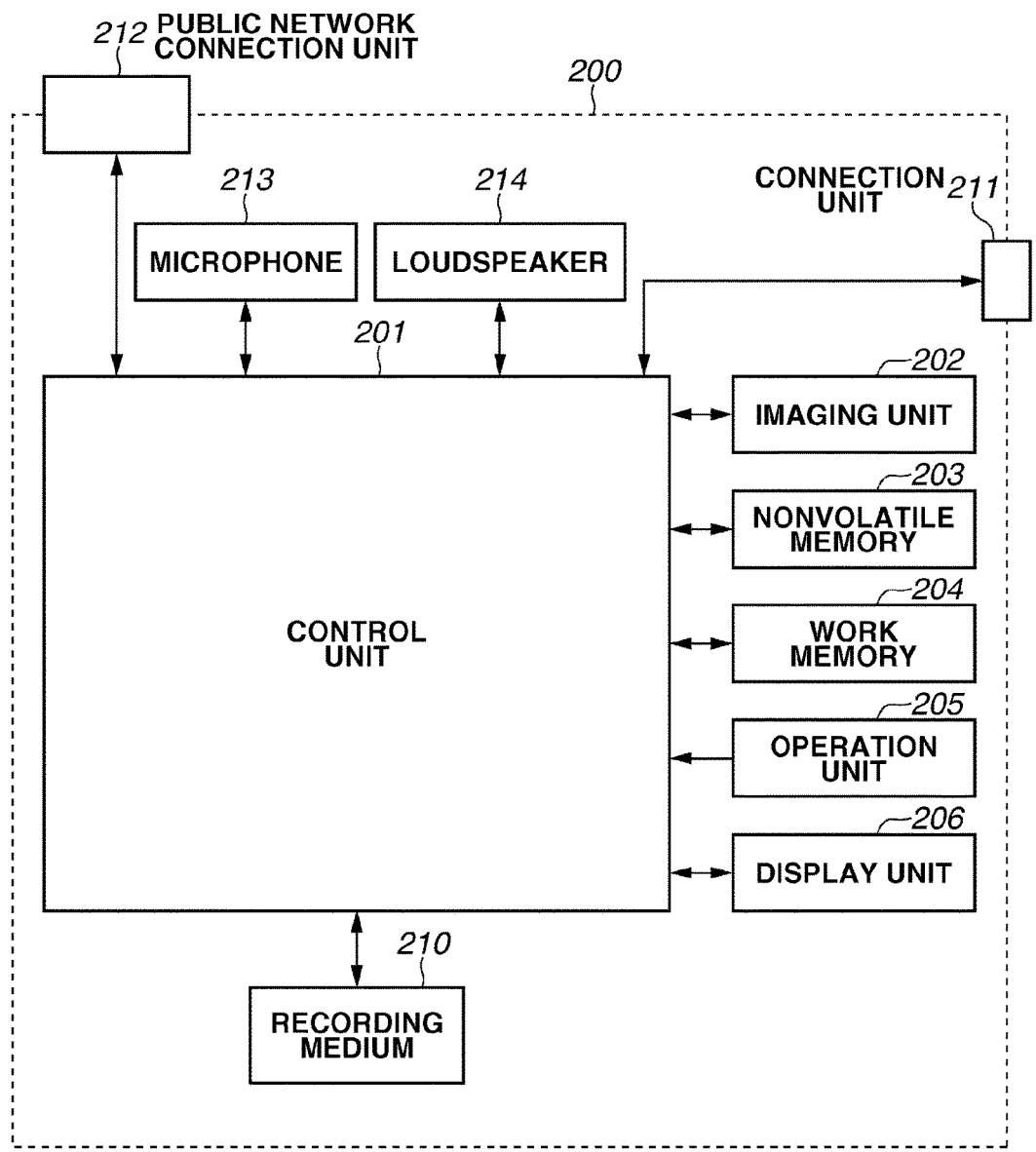
FIG. 2 is a block diagram illustrating a configuration of a mobile phone according to the first exemplary embodiment.

FIG. 2 is a block diagram illustrating an example of a configuration of the mobile phone 200 which is an example of a communication apparatus according to the present exemplary embodiment. A mobile phone is described as an example of the communication apparatus, however, the communication apparatus is not limited to a mobile phone. The communication apparatus may be information processing apparatuses such as a digital camera with a wireless function, a portable media player, a tablet device, a personal computer, and a smart phone, for example.

A control unit 201 controls each unit of the mobile phone 200 according to input signals and the program described below. A plurality of hardware units may share processing to control the entire apparatus instead of the control unit 201 controlling the entire apparatus.

An imaging unit 202 converts an object light imaged by a lens included in the imaging unit 202 into an electric signal, subjects the electric signal to noise reduction processing, and outputs digital data as image data. The captured image data is stored in a buffer memory, and then the control unit 201 performs a predetermined calculation thereof to store the image data in a recording medium 210.

A nonvolatile memory 203 is an electrically erasable and recordable nonvolatile memory, and stores programs executed by the control unit 201. It is assumed that a program for communicating with the digital camera 100 is also stored in the nonvolatile memory 203 and installed as a camera communication application. The processing of the mobile phone 200 according to the present exemplary embodiment is realized by reading the program provided by the camera communication application. It is assumed that the camera communication application has a program for using a basic function of an operating system (OS) installed in the mobile phone 200. The OS of the mobile phone 200 may have a program for realizing the processing in the present exemplary embodiment.

A work memory 204 is used as a buffer memory which temporarily stores the image data generated by the imaging unit 202, an image display memory for the display unit 206, and a work area for the control unit 201.

An operation unit 205 is used to receive instructions provided for the mobile phone 200 from the user. The operation unit 205 includes operation members such as a power source button for the user issuing instructions for turning on/off the power source of the mobile phone 200 and a touch panel formed on a display unit 206, for example.

The display unit 206 displays image data and characters for an interactive operation. The mobile phone 200 does not necessarily need to incorporate the display unit 206 therein. The mobile phone 200 is connectable to the display unit 206 and has only to include at least a display control function for controlling the display of the display unit 206.

The recording medium 210 can record image data output from the imaging unit 202. The recording medium 210 may be detachable to or incorporated in the mobile phone 200. In other words, the mobile phone 200 has only to have a unit for accessing at least the recording medium 210.

A connection unit 211 is an interface for connecting to an external apparatus. The mobile phone 200 according to the present exemplary embodiment can exchange data with the external apparatus via the connection unit 211. In the present exemplary embodiment, the connection unit 211 includes an interface for communicating with the external apparatus via a wireless LAN. The control unit 201 controls the connection unit 211 to realize wireless communication with the external apparatus. The digital camera 100 according to the present exemplary embodiment can operate as a slave device in an infrastructure mode and participate in a network formed by a nearby access point.

A public network connection unit 212 is an interface used in performing public wireless communication. The user can make a telephone call or data communications with other apparatuses using the mobile phone 200 via the public network connection unit 212. In performing a telephone call, the control unit 201 inputs and outputs an audio signal via a microphone 213 and a loudspeaker 214 respectively.

In the present exemplary embodiment, it is assumed that the public network connection unit 212 includes an interface for performing communication using a 3rd Generation (3G) communication system. Not only the 3 G communication system but also other communication systems such as Long Term Evolution (LTE), Worldwide Interoperability for Microwave Access (WiMAX), asymmetric digital subscriber line (ADSL), fiber-to-the-home (FTTH), and a so-called 4th Generation (4G) may be used. The connection unit 211 and the public network connection unit 212 do not necessarily need to be configured by independent hardware, but may be doubled by a single antenna, for example. In the above, the mobile phone 200 is described.

[Outline of Topology]

Figure 3A:
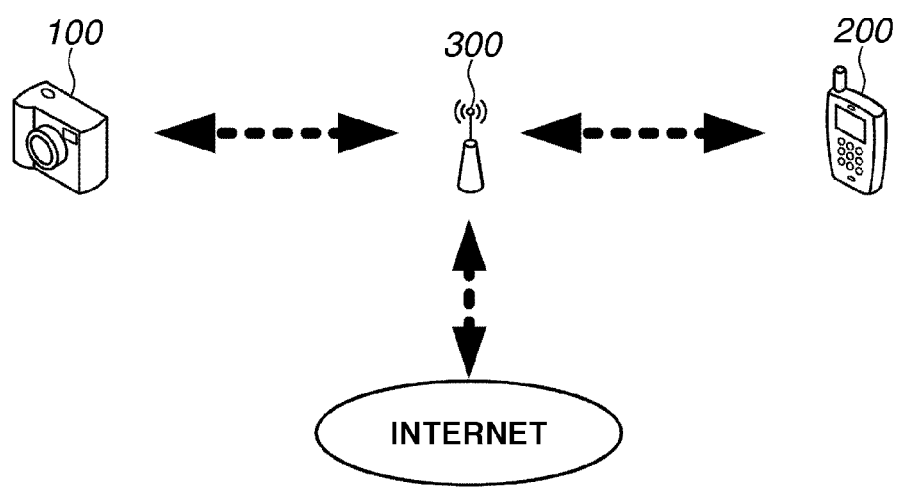
FIGS. 3A and 3B illustrate schematic diagrams respectively illustrating a network configuration according to the first exemplary embodiment.
Figure 3B:
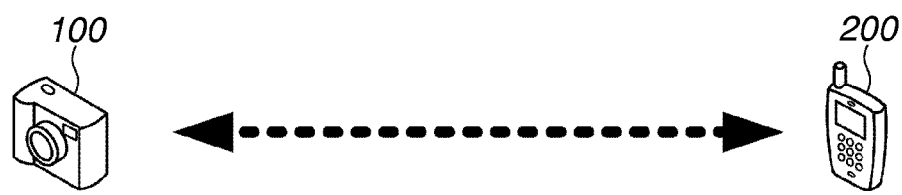

FIGS. 3A and 3B respectively illustrate a schematic diagram representing a topology of connection between the digital camera 100 and the mobile phone 200. In a case where the digital camera 100 and the mobile phone 200 wirelessly transfer data to each other, there are two types of topologies illustrated in FIGS. 3A and 3B.

FIG. 3A illustrates a topology in which the digital camera 100 and the mobile phone 200 participate in a wireless LAN network formed by an external access point (AP) 300 which is an example of an external relay apparatus. The digital camera 100 and the mobile phone 200 detect a beacon signal periodically transmitted by the external AP 300 and participate in the wireless LAN network formed by the external AP 300. After the digital camera 100 and the mobile phone 200 participate in the same wireless LAN network, the digital camera 100 and the mobile phone 200 detect each other and acquire capacities thereof to be brought into a state where the digital camera 100 and the mobile phone 200 can exchange data via the wireless LAN (to establish communication therebetween).

The external AP 300 according to the present exemplary embodiment can be connected to an external network such as the Internet using a public network. For this reason, the mobile phone 200 can transmit data to the Internet via the external AP 300.

FIG. 3B illustrates a topology in which the digital camera 100 and the mobile phone 200 are directly connected to each other not via the external AP 300. In this case, the digital camera 100 operates as a simple AP to form the wireless LAN network. The digital camera 100 operates as the simple AP to start to periodically transmit the beacon signal. The mobile phone 200 detects the beacon signal and participates in the wireless LAN network formed by the digital camera 100. As is the case with FIG. 3A, the digital camera 100 and the mobile phone 200 detect each other and acquire capacities thereof to establish communication therebetween and to be brought into a state where the digital camera 100 and the mobile phone 200 can exchange data.

As described above, the digital camera 100 according to the present exemplary embodiment does not have a function of communication with an external network such as the Internet. Therefore, the mobile phone 200 participating in the wireless LAN network formed by the digital camera 100 cannot transmit data to the Internet via the simple AP.

As described above, there are two types of topologies in the digital camera 100 and the mobile phone 200. In the present exemplary embodiment, an example will be described below in which an appropriate control is performed according to the topology.

[Connection Processing]

FIG. 4 is a flowchart illustrating processing of the digital camera 100 in connecting to the mobile phone 200. The processing illustrated in the flowchart is realized by the control unit 101 of the digital camera 100 controlling each unit of the digital camera 100 according to an input signal and the programs. Unless otherwise specified, this holds true for other flowcharts illustrating the processing of the digital camera 100. The flowchart starts according as the user issues instructions for connecting the digital camera 100 to other apparatuses via a menu operation.

In step S400, the control unit 101 displays on the display unit 106 a screen for selecting whether the digital camera 100 participates in the wireless LAN network formed by an external AP or the digital camera 100 operates as a simple AP. FIG. 5A-A illustrates an example of a screen displayed in this step.

In step S401, if the control unit 101 determines that a button 501 is selected by a user's operation, the control unit 101 determines that the formation of the wireless LAN network is selected (YES in step S401), and the processing proceeds to step S402. If the control unit 101 determines that a button 502 is selected by a user's operation, the control unit 101 determines that the digital camera 100 participates in the wireless LAN network formed by the external AP (NO in step S401), and the processing proceeds to step S407.

In step S402, the control unit 101 forms the wireless LAN network. More specifically, the control unit 101 generates an extended service set identifier (ESSID), a basic service set identifier (BSSID), an authentication system, an encryption type, and an encryption key which are required for forming a network. The control unit 101 displays on the display unit 106 at least the ESSID and the encryption key as information required for a connection apparatus participating in the network. An example of the display is illustrated in FIG. 5A-B. In the example of FIG. 5A-B, as indicated by a dialog 503, the ESSID is determined as "CAMERA-123" and the encryption key is determined as "12345678." The encryption key and the ESSID may be generated for each connection or for each connection apparatus, or may be always the same. In this step, an internet protocol (IP) address is allocated and a subnet is set to allow communication with other apparatuses. Thereafter, the processing proceeds to step S403.

In step S407, the control unit 101 scans a nearby wireless LAN network and displays a list of the ESSID included in the beacon signal resultantly detected on the display unit 106. An example of a screen in this case is illustrated in FIG. 5A-C. In the example of FIG. 5A-C, the ESSID of "NETWORK-100" and "NETWORK-101" is detected. If the wireless LAN network is selected from the list 506 in FIG. 5A-C by a user's operation, the control unit 101 participates in the selected wireless LAN network, in other words, performs processing for connection to the AP. Furthermore, in this step, the IP address is allocated and the subnet is set to allow communication with other apparatuses. Thereafter, the processing proceeds to step S403.

In step S403, the control unit 101 searches a connectable apparatuses in the same network. Incidentally, the mobile phone 200 needs to operate to be brought into a state where the digital camera 100 can search the mobile phone 200.

The operation of the mobile phone 200 is described below with reference to FIGS. 5A and 5B. FIG. 5B is a flowchart illustrating processing of the mobile phone 200 in the present exemplary embodiment. The processing illustrated in the flowchart is realized by the control unit 201 of the mobile phone 200 controlling each unit of the mobile phone 200 according to an input signal and the programs. Unless otherwise specified, this holds true for other flowcharts illustrating the processing of the mobile phone 200.

In step S551 in FIG. 5B-A, the control unit 201 causes the display unit 206 to display a screen for selecting the wireless LAN network in which the mobile phone 200 participates according as a predetermined operation is performed by the user of the mobile phone 200. When the screen is displayed, the control unit 201 scans a nearby wireless LAN network and displays a list 510 of the resultantly detected ESSID. An example of the screen is illustrated in FIG. 5A-E.

In the present exemplary embodiment, the processing is performed by the function of the OS of the mobile phone 200 before a camera communication application starts, however, a previously started camera communication application may perform the processing in collaboration with the function of the OS. If the digital camera 100 operates as the simple AP, the mobile phone 200 detects the ESSID of the digital camera 100 and displays the ESSID on the list 510. In FIG. 5A-E, "CAMERA-123" is displayed as the ESSID of the digital camera 100.

In step S552, the control unit 201 waits for selection of any of the ESSIDs in the list 510. If any of the ESSIDs in the list 510 is selected by a user's operation (YES in step S552), in step S553, the control unit 201 performs processing for participating in the corresponding wireless LAN network. Thus, participation in the network is completed.

After participation in the network, the user of the mobile phone 200 starts the camera communication application installed in the mobile phone 200. The processing of the mobile phone 200 after the camera communication application starts is described below with reference to a flowchart in FIG. 5B-B. The main functions of the camera communication application include a function to establish communication with digital cameras existing in the same network, a function to transmit and receive content data such as image data, and a function to control processing for transmitting content data owned by the mobile phone 200 to a server.

If the camera communication application starts based on a user's operation, in step S571, a standby screen illustrated in FIG. 5A-F is displayed on the display unit 206. A dialog 511 indicates the SSID of the network in which the mobile phone 200 participates at present. The example of FIG. 5A-F illustrates a case where "CAMERA-123" is selected in the screen illustrated in FIG. 5A-E. After the camera communication application starts, the mobile phone 200 notifies the digital camera 100 of its service via the wireless LAN network so that the digital camera 100 can detect the mobile phone 200. Based on the notification of the service, the digital camera 100 can detect the mobile phone 200. The notification of the service includes a device name and a universally unique identifier (UUID) of the mobile phone 200.

In step S572, the control unit 201 waits for a request for connection from the digital camera 100. If the control unit 201 determines that the digital camera 100 makes a connection request (YES in step S572), in step S573, the control unit 201 establishes communication with the digital camera 100.

We return to the description of FIG. 4. In step S403, the control unit 101 searches connectable apparatuses existing in the same network. As described above, if the mobile phone 200 notifies the digital camera 100 of its service, the digital camera 100 can detect the mobile phone 200. If the control unit 101 detects a connectable apparatus as a result of the search, the control unit 101 lists the device name included in the notification of the service on the display unit 106. An example of the list is illustrated in FIG. 5A-D. The UUID included in the notification of the service is associated with the device name and stored in the work memory 104.

In the present exemplary embodiment, the device name and the UUID are included in the notification of the service, however, the digital camera 100 receiving the notification of the service may inquire of the mobile phone 200 the device name and the UUID.

In step S404, the control unit 101 receives a user's operation for selecting any of the apparatuses listed in step S403.

In step S405, the control unit 101 transmits a request for connection to the mobile phone 200 using the UUID of the apparatus selected in step S404, and starts processing for establishing communication with the selected apparatus. In the present exemplary embodiment, the control unit 101 executes connection using the UUID of a communication partner, however, connection can be performed by identifying an IP address or a port number from the UUID, or the IP address may be acquired in searching. After communication is established, the processing proceeds to step S406.

In step S406, the control unit 101 notifies the mobile phone 200 with which communication is established in step S405 whether the wireless LAN network in which the digital camera 100 participates at present is formed by the simple AP. More specifically, if the digital camera 100 operates as the simple AP and the mobile phone 200 participates in the wireless LAN network of the digital camera 100, the digital camera 100 notifies the mobile phone 200 that the wireless LAN network is formed by the digital camera 100.

If the mobile phone 200 participates in the wireless LAN network formed by another AP, the digital camera 100 notifies the mobile phone 200 that the wireless LAN network is formed not by the digital camera 100. This notification allows the mobile phone 200 to determine whether the mobile phone 200 participates in the network formed by the digital camera 100 or another AP. Based on the notification, the mobile phone 200 can determine whether to allow communication with an external network via the wireless LAN network in which the mobile phone 200 participates.

[Operation after Connection]

FIG. 6 is a flowchart illustrating an operation of the mobile phone 200 after the establishment of communication with the digital camera 100.

Figure 7A:
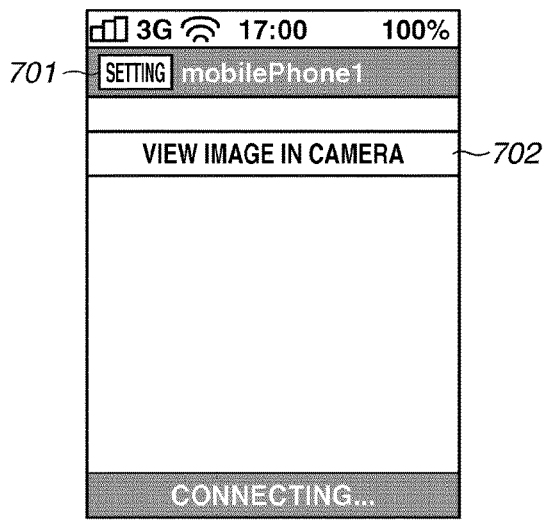
FIGS. 7A, 7B, 7C, 7D, 7E, and 7F illustrate examples of display screens according to the first exemplary embodiment.

After the establishment of communication with the digital camera 100, the control unit 201 of the mobile phone 200 displays a menu screen of the camera communication application illustrated in FIG. 7A on the display unit 206. The menu screen displays a setting button 701 and a browser button 702. The setting button 701 is used to set the device name of the mobile phone 200 and to perform various settings in uploading. The browser button 702 is used to display the image data stored in the digital camera 100, with which communication is established, on the display unit 206.

In step S601, the control unit 201 determines whether the browser button 702 is selected. If the control unit 201 determines that the browser button 702 is selected (YES in step S601), the processing proceeds to step S602. If the control unit 201 determines that the browser button 702 is not selected (NO in step S601), the processing is repeated.

In step S602, the control unit 201 requests the digital camera 100 to transmit a thumbnail of the image data owned by the digital camera 100. The digital camera 100 transmits the requested thumbnail to the mobile phone 200 in response to the request. The control unit 201 may repetitively request the digital camera 100 to transmit the thumbnail one by one, or may transmit a command for requesting the digital camera 100 to collectively transmit a plurality of the thumbnails.

In step S603, the mobile phone 200 receives the thumbnail transmitted from the digital camera 100 via the connection unit 211.

Figure 7C:
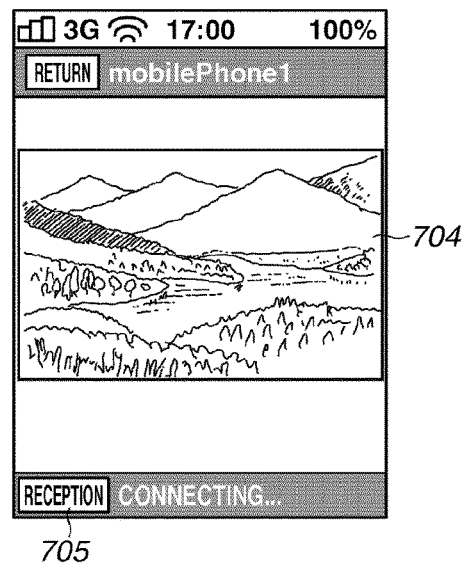
Figure 7B:
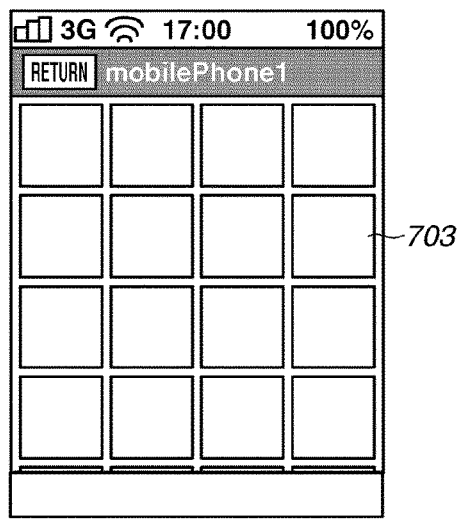

In step S604, the control unit 201 lists the received thumbnail on the display unit 206. FIG. 7B illustrates an example of the display screen. In FIG. 7B, the thumbnails are displayed in four columns. An upward or downward scroll operation allows other image data to be displayed.

In step S605, the control unit 201 determines whether any of the thumbnails is selected from the listed thumbnails. If the control unit 201 determines that any of the thumbnails is selected (YES in step S605), the processing proceeds to step S606. Otherwise (NO in step S605), the processing returns to step S604.

In step S606, the control unit 201 displays the selected thumbnail in an enlarged size. FIG. 7C illustrates an example of a displayed thumbnail. As illustrated in FIG. 7C, the selected thumbnail is larger than a thumbnail in FIG. 7B. In step S606, the selected thumbnail is displayed in an enlarged size as it is, however, the digital camera 100 may be requested again to transmit a larger thumbnail or the image data.

The screen illustrated in FIG. 7C includes a reception button 705. The reception button 705 is used to receive the image data corresponding to the displayed thumbnail from the digital camera 100 and to subject the received image data to predetermined processing. This is described in detail below.

Figure 7D:
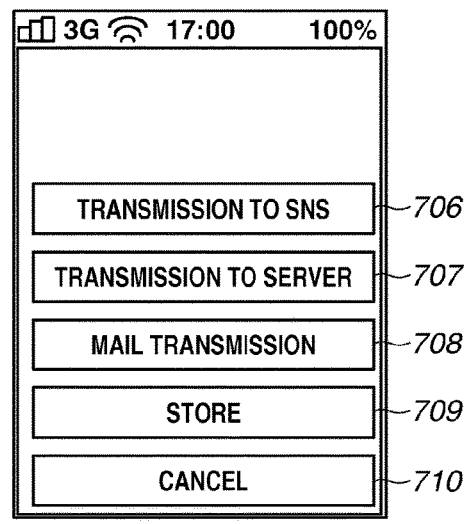

When the button 705 is selected by a user's operation, the control unit 201 superimposes a semi-transparent menu illustrated in FIG. 7D onto the image data and displays the menu. The buttons included in the menu are described below.

A button 706 is used to upload the image data received from the digital camera 100 to a social network service (SNS) via the Internet. The user of the mobile phone 200 previously sets the SNS to which data is to be uploaded. When the button 706 is selected, processing for transmitting the image data to a server provided by the SNS starts. The processing for setting the SNS to which data is uploaded may start according to the selection of the button 706.

A button 707 is used to upload the image data received from the digital camera 100 to a contents server. The user of the mobile phone 200 previously sets the contents server to which data is uploaded. When the button 707 is selected, processing for transmitting the image data to the contents server via the Internet starts. The processing for setting the contents server to which data is uploaded may start according to the selection of the button 707.

A button 708 is used to attach the image data received from the digital camera 100 to a mail and transmit them. When the button 708 is selected, the control unit 201 starts a mail application to provide a mail template to which the received image data is attached. The user of the mobile phone 200 inputs a desired text and can transmit a mail to any address via the Internet.

A button 709 is used to record (store) the image data received the digital camera 100 in the recording medium 210. When the button 709 is selected, the image data received the digital camera 100 is recorded in the recording medium 210.

A button 710 is a cancel button. The button 710 is selected to delete the menu illustrated in FIG. 7D and to return the display to a state illustrated in FIG. 7C.

In step S607, the control unit 201 determines whether any of the buttons 706 to 709 illustrated in FIG. 7D is selected. If the control unit 201 determines that any of the buttons 706 to 709 is selected (YES in step S607), the processing proceeds to step S608. If the control unit 201 determines that the button 710 is selected (NO in step S607), the processing returns to step S606.

Figure 7E:
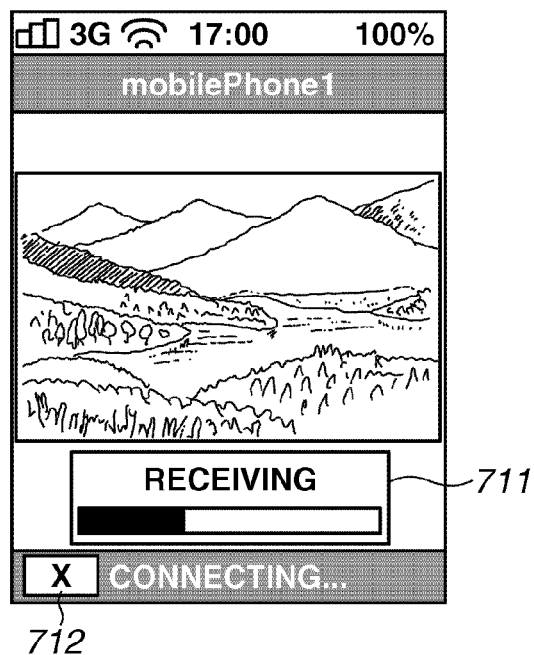

In step S608, the control unit 201 requests the mobile phone 200 to transmit the image data corresponding to the thumbnail selected in step S605. When the mobile phone 200 transmits the image data to the digital camera 100 in response to the request, the mobile phone 200 receives the image data and stores the image data in the work memory 204. The display unit 206 displays a screen illustrated in FIG. 7E while the image data is being received. The user of the mobile phone 200 can cancel reception by selecting a button 712 illustrated in FIG. 7E.

When the reception of the image data is completed, the processing proceeds to step S609. The control unit 201 determines whether any of the buttons is selected in step S607. If the control unit 201 determines that any of the buttons 706, 707, or 708 is selected, in other words, the operation for transmitting the received image data to the outside is selected, the processing proceeds to step S611.

If the control unit 201 determines that the button 709 is selected, in other words, the operation for storing the received image data in the recording medium 210 without transmitting the received image data to the outside is selected, the processing proceeds to step S610.

The processing in step S610 is described below. In step S610, the control unit 201 stores the image data received in step S608 in recording medium 210 from the work memory 204 and ends the processing.

The processing in step S611 is described below. In step S611, the control unit 201 determines whether the network in which the mobile phone 200 participates at present is formed by the simple AP function of the digital camera 100. The control unit 201 makes determination in the present step with reference to the notification received from the digital camera 100 in step S406 illustrated in FIG. 4. If the control unit 201 determines that the network is formed not by the simple AP function of the digital camera 100 (NO in step S611), the processing proceeds to step S612. If the control unit 201 determines that the network is formed by the simple AP function of the digital camera 100 (YES in step S611), the processing proceeds to step S613.

The case where the processing proceeds from step S611 to step S612 is described below. In this case, the control unit 201 determines that the network in which the mobile phone 200 participates at present is formed not by the simple AP function, but by the external AP. In other words, the control unit 201 determines that the topology illustrated in FIG. 3A is used. In this case, the mobile phone 200 can transmit image data via the external AP. Then, the control unit 201 transmits predetermined transmission destination information (a universal resource locator (URL) or a mail address) via the Internet and the image data received in step S608 to the external AP. Accordingly, the image data is transmitted from the external AP to the transmission destination.

The case where the processing proceeds from step S611 to step S613 is described below. In this case, the control unit 201 determines that the topology illustrated in FIG. 3B is used. Therefore, the mobile phone 200 is connected to the network formed by the AP but cannot transmit image data to the external network via the AP. The mobile phone 200 leaves the network in which the mobile phone 200 participates and disconnects with the AP (the digital camera 100).

In step S614, the control unit 201 transmits image data to the outside by a communication method not via the digital camera 100. In the present exemplary embodiment, the image data is transmitted by communication via the 3G network using the public network connection unit 212.

As another exemplary embodiment, the mobile phone 200 is connected to the network formed by the AP instead of the digital camera 100 using the connection unit 211 to allow the image data to be transmitted via the AP. If data communication via the public network connection unit 212 can be performed in parallel to data communication via the connection unit 211, in step S613, the data communication via the public network connection unit 212 may be performed without leaving the network.

Figure 7F:
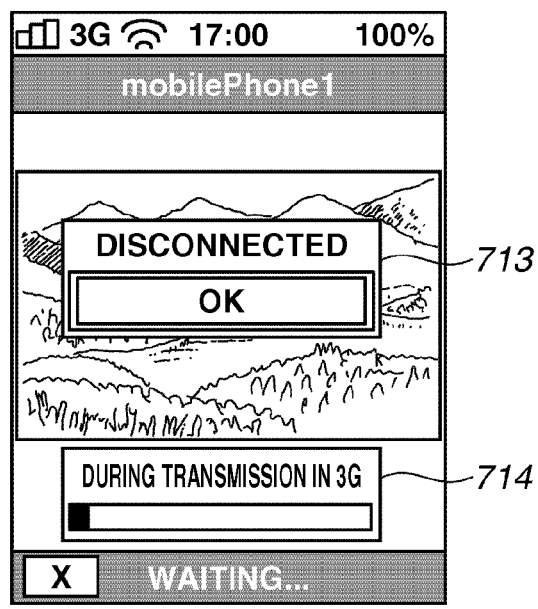

A screen displayed on the display unit 206 in processing performed in steps S613 and S614 is illustrated in FIG. 7F. A dialog 713 of the screen illustrated in FIG. 7F notifies the user that the mobile phone 200 is disconnected from the network in which the mobile phone 200 participates until now and which is formed by the digital camera 100.

A dialog 714 notifies the user that the image data is transmitted by another communication method. The reason is that, if only the dialog 713 is displayed, the user may probably think that the image data cannot be transmitted any longer. In the present exemplary embodiment, therefore, there are displayed not only the dialog indicating that the mobile phone 200 is disconnected from the network, but also the dialog indicating that transmission is being made.

There is a method in which the mobile phone 200 leaves the network in a case where a determination is not made in step S611 and the image data cannot be transmitted for a certain time period or a certain number of times in step S612. In this case, however, it may probably take the mobile phone 200 a long time to leave the network and communication traffic volume may also be increased. For this reason, it is preferable that the digital camera 100 previously notifies the mobile phone 200 whether the network is formed by the simple AP or not.

A screen may be displayed on which a comment or a title is added to the image data before the image data is transmitted in steps S613 and S614, and an SNS is set (a publication range and a selection of an album, for example).

In the above, the example is described in which one piece of image data is received from the digital camera 100 and transmitted from the mobile phone 200. However, the mobile phone 200 selectively receives a plurality of pieces of image data and may sequentially transmit them to the external network. Once the image data is received, and then it may be selected which of image data is to be transmitted from the mobile phone 200.

It is described above how the mobile phone 200 operates after it is connected with the digital camera 100. The operation of the digital camera 100 will be described in detail below. FIG. 8 is a flowchart illustrating how the digital camera 100 operates after it is connected with the mobile phone 200.

In step S801, the control unit 101 of the digital camera 100 determines whether a request is received from the mobile phone 200 via the connection unit 111. If the request is received (YES in step S801), the processing proceeds to step S804. If the request is not received (NO in step S801), the processing proceeds to step S802. A request which the digital camera 100 may receive is a request for any of the thumbnail transmitted in step S602 or the image data transmitted in steps S607 to S608.

The processing in step S804 is described below. In step S804, the control unit 101 determines whether the request received in step S801 is the one for the thumbnail (the request transmitted in step S602). If the control unit 101 determines that the request is the one for the thumbnail (YES in step S804), the processing proceeds to step S805. If the control unit 101 determines that the request is not the one for the thumbnail (NO in step S804), the processing proceeds to step S807.

The processing in step S805 is described below. In step S805, the control unit 101 searches the image data which the mobile phone 200 requests the digital camera 100 to transmit from the image data stored in the recording medium 110 and reads the thumbnail corresponding to the searched image data into the work memory 104. Needless to say, a plurality of the thumbnails can be read. In this case, the thumbnail already associated with the image data may be used or a new thumbnail may be separately generated.

In step S806, the control unit 101 transmits the thumbnail stored in the work memory 104 to the mobile phone 200 which sends the request and the processing returns to step S801. As a result of the processing, the mobile phone 200 executes the thumbnail reception processing in step S603. In the above, the processing is described in which the thumbnail is transmitted from the digital camera 100 to the mobile phone 200.

The processing in step S807 is described below. In step S807, the control unit 101 determines whether the request received in step S801 is the one for the image data corresponding to the thumbnail (the request transmitted in step S607). If the control unit 101 determines that the request is the one for the image data (YES in step S807), the processing proceeds to step S808. If the control unit 101 determines that the request is not the one for the image data (NO in step S807), the processing proceeds to step S810.

The processing in step S808 is described below. In step S808, the control unit 101 searches the image data which the mobile phone 200 requests the digital camera 100 to transmit from the image data stored in the recording medium 110 and reads the searched image data into the work memory 104.

In step S809, the control unit 101 transmits the image data stored in the work memory 104 to the mobile phone 200. The processing returns to step S801. As a result of the processing, the mobile phone 200 executes the image data reception processing in step S608.

In step S810, the control unit 101 determines that the digital camera 100 cannot appropriately answer the received request and notifies the mobile phone 200 of error information indicating that the digital camera 100 cannot answer the request.

The case where the processing proceeds from step S801 to step S802 is described below. In step S802, the control unit 101 determines whether disconnection is made. In the following cases, the disconnection is determined to be made if the communication established with the mobile phone 200 is cut off, the mobile phone 200 does not exist on the network any longer, and the digital camera 100 cannot receive the beacon signal from the AP to lose the network. If the digital camera 100 operates as the simple AP, the digital camera 100 never loses the network. If the control unit 101 determines that the disconnection is made (YES in step S802), the processing proceeds to step S803. If the control unit 101 determines that the disconnection is not made (NO in step S802), the processing returns to step S801.

In step S803, the control unit 101 determines whether the digital camera 100 operates as the simple AP. If the control unit 101 determines that the digital camera 100 does not operate as the simple AP (NO in step S803), the processing proceeds to step S811. If the control unit 101 determines that the digital camera 100 operates as the simple AP (YES in step S803), the processing proceeds to step S812.

In step S811, the control unit 101 leaves the network in which the digital camera 100 participates. On the other hand, in step S812, the control unit 101 removes the network formed by the digital camera 100. More specifically, the control unit 101 stops the transmission of the beacon signal and notifies the network that the network is removed.

In the above, the processing for transmitting the image data from the digital camera 100 to the mobile phone 200 is described.

[Outline of Operation]

Figure 10:
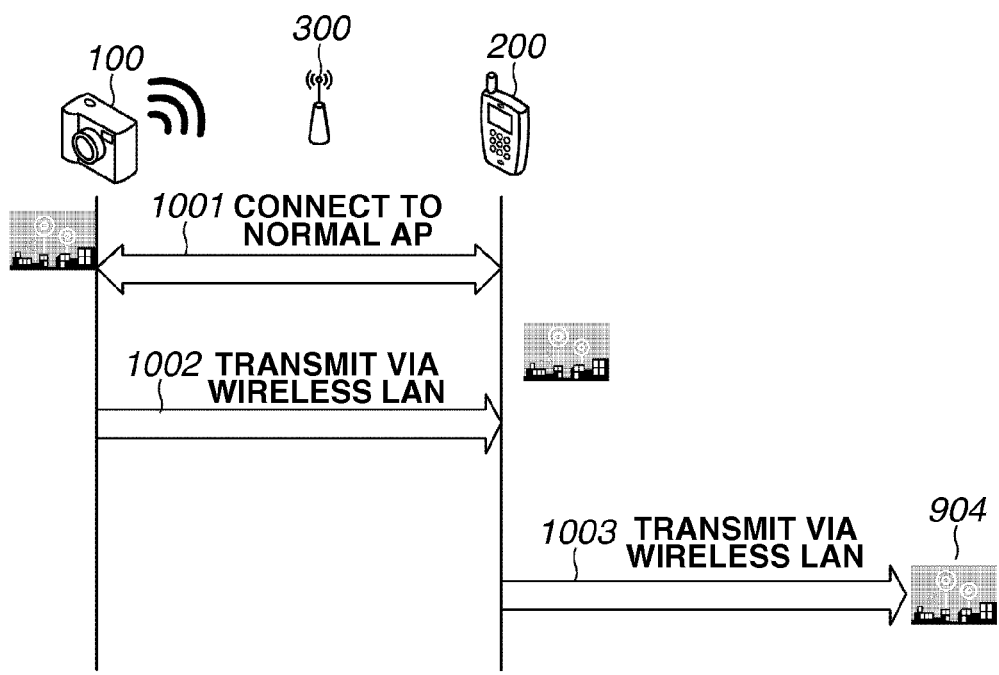
FIG. 10 illustrates an outline of an operation according to the first exemplary embodiment.

The outline of the processing illustrated in FIGS. 6 and 8 is described below with reference to FIGS. 9A, 9B, and 10. FIGS. 9A, 9B, and 10 are schematic diagrams illustrating that the mobile phone 200 receives the image data of the digital camera 100 and transmits the received image data to the Internet 904.

A case where the digital camera 100 operates as the AP (step S402 in FIG. 4) is described below with reference to FIG. 9A. In this case, in timing 901, the digital camera 100 and the mobile phone 200 participate in the network formed by the digital camera 100 to establish communication. At this point, the digital camera 100 notifies the mobile phone 200 whether the present network is formed by the digital camera 100 (step S406 in FIG. 4).

In timing 902, the digital camera 100 transmits the image date thereof to the mobile phone 200 via the wireless LAN network formed by the digital camera 100.

The mobile phone 200 transmits the received image data to the Internet. The mobile phone 200 recognizes that the present network is formed by the digital camera 100, through a previous notification. In timing 903, the mobile phone 200 leaves the network formed by the digital camera 100 and transmits the image data to the Internet 904 using 3G via a public network. The above is the outline of an operation in a case where the digital camera 100 operates as the AP.

A topology illustrated in FIG. 9B is possible as an operation in a case where the digital camera 100 operates as the AP. In the topology illustrated in FIG. 9B, after the mobile phone 200 leaves the network in timing 903, if there is the external AP 300 nearby, the mobile phone 200 participates in the network formed by the external AP 300 in timing 913. In timing 914, the mobile phone 200 transmits the image data to the Internet 904 via the external AP 300.

The connection to the external AP 300 at this point may be performed by a user's operation. An advantage of such an operation in FIG. 9B is described below. If the digital camera 100 communicates with the mobile phone 200, it is higher in communication speed for the digital camera 100 to directly communicate with the mobile phone 200 than to communicate therewith via the external AP 300, in most cases. Then, it is efficient for the digital camera 100 to perform direct data communication with the mobile phone 200 using the network formed by the digital camera 100, and for the digital camera 100 and the mobile phone 200 to participate in the network formed by the external AP at the timing when data communication via the Internet is required. Thus, the network in which the digital camera 100 and the mobile phone 200 participate is changed from a first network to a second network to allow data to be transmitted to the Internet.

A case where the network formed by the external AP 300 is used (step S407 in FIG. 4) is described below with reference to FIG. 10. In timing 1001, the digital camera 100 and the mobile phone 200 participate in the network formed by the external AP 300.

Communication is established between the digital camera 100 and the mobile phone 200 via the external AP 300. In timing 1002, the digital camera 100 transmits the image data to the mobile phone 200 via the external AP 300 and the mobile phone 200 receives the image data.

The mobile phone 200 transmits the received image data to the Internet. The mobile phone 200 recognizes that the present network is not formed by the digital camera 100, through the previous notification. In timing 1003, the mobile phone 200 transmits the image data to the external AP 300 so that the image data is transmitted to the Internet. The above is the outline of an operation in a case where the external AP 300 is used.

As described above, in the present exemplary embodiment, the digital camera 100 notifies the mobile phone 200 whether the network in which the digital camera 100 participates is formed by the simple AP function thereof. This configuration enables the mobile phone 200 to execute appropriate processing according to the characteristic of the network.

In the present exemplary embodiment, the user operates the mobile phone 200 to instruct the digital camera 100 to transmit the image data to the mobile phone 200 or the Internet. On the other hand, the user may operate the digital camera 100 to instruct the digital camera 100 to transmit the image data to the mobile phone 200 or the mobile phone 200 to transmit the image data to the Internet.

In the present exemplary embodiment, the digital camera 100 forms a network to directly communicate with the mobile phone 200. On the other hand, the present invention is applicable to a topology in which apparatuses previously communicate with each other like "Wi-Fi Direct" and an AP is formed by either of them.

The present exemplary embodiment cites as an example a control for switching a network when the mobile phone 200 transmits the image data received from the digital camera 100 via the Internet, however the scope of application of the present invention is not limited to the above example. For example, if it is determined that the network in which apparatuses participate is formed by the digital camera 100, the mobile phone 200 may perform a similar control in using applications utilizing the Internet such as a web browser and an electronic mail of the mobile phone 200.

A first exemplary embodiment describes that the mobile phone 200 switches the network if required. However, there may be a system which cannot easily perform a control for switching the network. Particularly, in a mobile phone called "smart phone", a duty allotment between the OS and applications operating on the OS is clear to a certain extent.

For example, switching of the network is a function of the OS and the network may not be switched from applications. In the present exemplary embodiment, even in the above case, appropriate processing can be executed according to the characteristic of the network.

Since the present exemplary embodiment is common to the first exemplary embodiment in most parts thereof, the description of the common parts is omitted and the parts specific to the present exemplary embodiment are described. In the following description, there are some parts written as if the OS or the camera communication application is an entity of the processing, actually, however, it is to be understood that the control unit 201 reads any program of the OS or the camera communication application to realize various types of processing.

Figure 11:
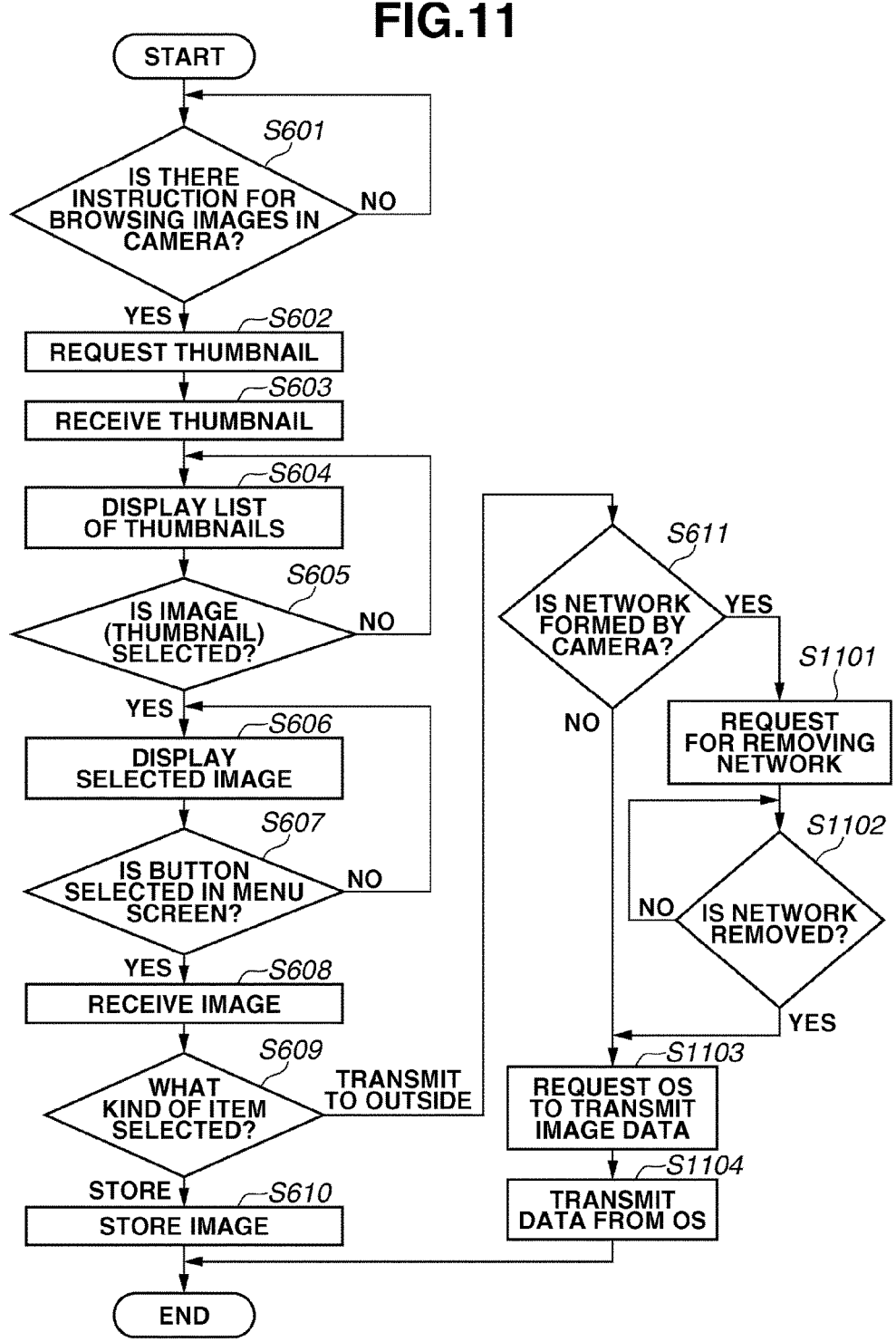
FIG. 11 is a flowchart illustrating an operation of a mobile phone according to a second exemplary embodiment.

FIG. 11 is a flowchart illustrating an operation of the mobile phone 200 according to the present exemplary embodiment. The flowchart illustrates processing performed after the mobile phone 200 is connected to the digital camera 100. Steps similar to the ones in FIG. 6 are given the same step numbers. Steps different from the ones in FIG. 6 are steps S1101 to S1104.

In step S1101, the camera communication application requests the connected digital camera 100 to remove the formed network. The digital camera 100 receiving the request removes the network formed by the simple AP function thereof. As described above, the network is removed such that the digital camera 100 stops the transmission of the beacon signal and notifies the network that the network is removed.

In step S1102, the mobile phone 200 determines whether the connected network is removed. If the mobile phone 200 determines that the network is removed (YES in step S1102), the processing proceeds to step S1103. If the mobile phone 200 determines that the network is not removed (NO in step S1102), the processing is repeated.

If the OS in the present exemplary embodiment detects that the network in which the mobile phone 200 participates until now is removed, the OS switches the network. A nearby wireless LAN network is searched and if the previously connected wireless LAN network is detected, the mobile phone 200 participates in the network.

If the previously connected wireless LAN network is not detected, the network is switched to 3 G communication. Thus, the camera communication application cannot directly switch the network in which the mobile phone 200 participates, but can indirectly switch the network by performing control so as to remove the network formed by the digital camera 100.

In step S1103, the camera communication application requests the OS to transmit the image data to the Internet. More specifically, the camera communication application notifies the OS of the address of transmission destination and information identifying the image data to be transmitted. The processing of the camera communication application ends here.

In step S1104, the OS transmits the image data to the Internet via the network in which the mobile phone 200 participates.

Figure 12:
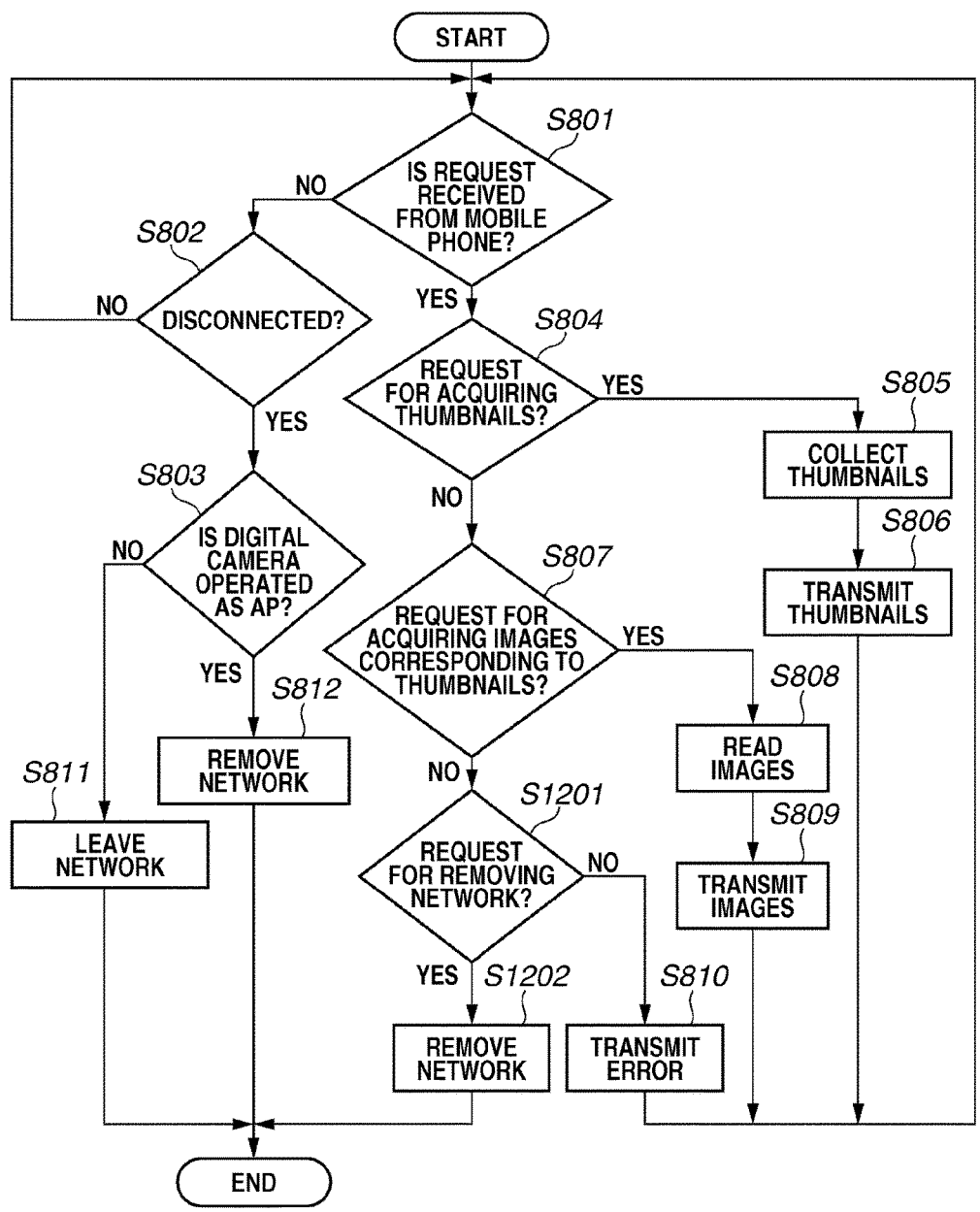
FIG. 12 is a flowchart illustrating an operation of a digital camera according to the second exemplary embodiment.

The above describes the operation of the mobile phone 200 according to the present exemplary embodiment. The following describes an operation of the digital camera 100. FIG. 12 is a flowchart illustrating the operation of the digital camera 100 according to the present exemplary embodiment.

The flowchart illustrates processing performed after the digital camera 100 is connected to the mobile phone 200. Steps similar to the ones in FIG. 8 are given the same step numbers. Steps different from the ones in FIG. 8 are steps S1201 and S1202. In step S807, if the control unit 101 determines that the request is not the one for the image data, the processing proceeds to step S1201.

In step S1201, the control unit 101 determines whether the mobile phone 200 requests the removal of the network. If the mobile phone 200 requests the removal thereof (YES in step S1201), the processing proceeds to step S1202. If the mobile phone 200 does not request the removal thereof (NO in step S1201), the processing proceeds to step S810 to transmit an error.

In step S1202, the control unit 101 removes the network formed by the simple AP function of the digital camera 100 and ends the processing.

In the present exemplary embodiment, the network is removed at the time when a request for removing the network is received. However, the digital camera 100 may reply to the mobile phone 200 that removal processing is received, and remove the network after a predetermined time elapses. This allows the mobile phone 200 to recognize that the request is received.

As described above, according to the present exemplary embodiment, even if an application of the mobile phone 200 cannot remove the network, the image data can be uploaded by an optimal network without the user being aware of the connection state of the network.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-159520 filed Jul. 18, 2012, which is hereby incorporated by reference herein in its entirety.

What is claimed is:

1. A communication apparatus capable of participating in a network formed by a relay apparatus, the communication apparatus comprising:
   a processor and a memory;
   a data communication unit that establishes communication with a data processing apparatus via the network formed by the relay apparatus to perform data communication with the data processing apparatus;
   a reception unit that receives a notification from the data processing apparatus indicating whether the network in which the communication apparatus participates at present is a first network which is formed by the data processing apparatus operating as the relay apparatus; and
   a control unit that controls transmission of data from the communication apparatus via the Internet;
   wherein, if the reception unit receives the notification indicating that the network in which the communication apparatus participates at present is the first network formed by the data processing apparatus operating as the relay apparatus, reception data from the data processing apparatus by the data communication unit is performed via the first network formed by the data processing apparatus operating as the relay apparatus, and data transmission via the Internet based on control by the control unit is performed via a second network different from the first network, and if the reception unit receives the notification indicating that the network in which the communication apparatus participates at present is the first network formed by the data processing apparatus operating as the relay apparatus, the control unit causes the communication apparatus to leave the first network after receiving data via the first network so that the data transmission via the Internet is performed via the second network,
   wherein, if the reception unit does not receive the notification indicating that the network in which the communication apparatus participates at present is the first network formed by the data processing apparatus operating as the relay apparatus, the data reception from the data processing apparatus by the data communication unit is performed via a third network different from the first network, and the data transmission via the Internet based on control by the control unit is performed via the third network, and
   wherein the units are implemented upon execution of instructions stored in the memory by the processor.

2. The communication apparatus according to claim 1, wherein, the second network is a public network, and the control unit performs control so that the data transmission from the communication apparatus via the Internet is performed via the second network.

3. The communication apparatus according to claim 2, wherein the public network is a network using a 3rd Generation (3G) or a Long Term Evolution (LTE) communication system.

4. The communication apparatus according to claim 1, wherein the second network is a network formed by another relay apparatus different from the data processing apparatus.

5. The communication apparatus according to claim 1, wherein the third network is a network formed by another relay apparatus different from the data processing apparatus.

6. The communication apparatus according to claim 1, wherein the second network and the third network are the same network formed by another relay apparatus different from the data processing apparatus.

7. The communication apparatus according to claim 1, wherein the data processing apparatus does not have a unit configured to connect with a public network.

8. The communication apparatus according to claim 1, wherein the data processing apparatus does not have a gateway function.

9. The communication apparatus according to claim 1, wherein the third network is formed by a relay apparatus including a unit configured to connect with a public network.

10. The communication apparatus according to claim 1, wherein the third network is formed by a relay apparatus including a gateway function.

11. The communication apparatus according to claim 1, wherein the relay apparatus forming the first network is an access point in a wireless LAN network.

12. The communication apparatus according to claim 1, wherein the communication apparatus is a mobile phone.

13. The communication apparatus according to claim 1, wherein the communication apparatus is a tablet device.

14. The communication apparatus according to claim 1, wherein the data processing apparatus is a digital camera.

15. The communication apparatus according to claim 1, wherein the data processing apparatus is a tablet device.

16. A method for controlling a communication apparatus capable of participating in a network formed by a relay apparatus, the method comprising:
   establishing communication with a data processing apparatus via the network formed by the relay apparatus to perform data communication with the communication apparatus;
   receiving a notification indicating whether the network in which the communication apparatus participates at present is a first network which is formed by the data processing apparatus operating as the relay apparatus; and
   controlling transmission of data from the communication apparatus via the Internet,
   wherein, if the notification indicating that the network in which the communication apparatus participates at present is the first network formed by the data processing apparatus operating as the relay apparatus is received, data reception from the data processing apparatus is performed via the first network formed by the data processing apparatus operating as the relay apparatus, and data transmission via the Internet based on the controlling transmission of data is performed via a second network different from the first network, and if the notification indicating that the network in which the communication apparatus participates at present is the first network formed by the data processing apparatus operating as the relay apparatus, the communication apparatus leave the first network after receiving data via the first network so that the data transmission via the Internet is performed via the second network,
   wherein, if the communication apparatus does not receive the notification indicating that the network in which the communication apparatus participates at present is the first network formed by the data processing apparatus operating as the relay apparatus, the data reception from the data processing apparatus by the communication apparatus is performed via a third network different from the first network, and the data transmission via the Internet based on control by the communication apparatus is performed via the third network.

17. A non-transitory computer readable storage medium storing a program for causing a computer to execute respective steps of a method for controlling a communication apparatus capable of participating in a network formed by a relay apparatus, the steps comprising:

establishing communication with a data processing apparatus the network to perform data communication with the communication apparatus;

receiving a notification indicating whether the network in which the communication apparatus participates at present is a first network which is formed by the data processing apparatus operating as the relay apparatus; and controlling transmission of data from the communication apparatus via the Internet, wherein, if the notification indicating that the network in which the communication apparatus participates at present is the first network formed by the data processing apparatus operating as the relay apparatus is received, data reception from the data processing apparatus is performed via the first network formed by the data processing apparatus operating as the relay apparatus, and data transmission via the Internet based on the controlling transmission of data is performed via a second network different from the first network, and if the notification indicating that the network in which the communication apparatus participates at present is the first network formed by the data processing apparatus operating as the relay apparatus, the communication apparatus leave the first network after receiving data via the first network so that the data transmission via the Internet is performed via the second network, wherein, if the communication apparatus does not receive the notification indicating that the network in which the communication apparatus participates at present is the first network formed by the data processing apparatus operating as the relay apparatus, the data reception from the data processing apparatus by the communication apparatus is performed via a third network different from the first network, and the data transmission via the Internet based on control by the communication apparatus is performed via the third network.

* * * * *